United States Patent
Brown et al.

(10) Patent No.: US 9,228,507 B2
(45) Date of Patent: Jan. 5, 2016

(54) DUAL FUEL COMMON RAIL SYSTEM AND DIESEL ONLY METHOD OF OPERATING SAME

(71) Applicant: Caterpillar Inc., Peoria, IL (US)

(72) Inventors: Cory A. Brown, Peoria, IL (US); Joshua W. Steffen, El Paso, IL (US); Dana R. Coldren, Secor, IL (US); Alan R. Stockner, Metamora, IL (US); Hoisan Kim, Dunlap, IL (US); Dianqi Fang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 573 days.

(21) Appl. No.: 13/732,673

(22) Filed: Jan. 2, 2013

(65) Prior Publication Data

US 2014/0182552 A1    Jul. 3, 2014

(51) Int. Cl.
*F02M 69/50* (2006.01)
*F02D 41/22* (2006.01)
*F02D 19/10* (2006.01)

(52) U.S. Cl.
CPC ............... *F02D 19/10* (2013.01); *F02D 41/22* (2013.01); *Y02T 10/36* (2013.01)

(58) Field of Classification Search
CPC ..... F02D 19/10; F02D 41/22; F02D 41/0027; F02D 41/3076
USPC .......... 701/104, 107; 123/525, 526, 479, 690, 123/27 GE
See application file for complete search history.

(56) References Cited

U.S. PATENT DOCUMENTS

| | | | | |
|---|---|---|---|---|
| 4,499,885 A * | 2/1985 | Weissenbach | ...... | F02D 19/0647 123/27 GE |
| 5,868,121 A | 2/1999 | Brown et al. | | |
| 6,240,910 B1 * | 6/2001 | Maekawa | ............ | F02D 41/0027 123/198 D |
| 6,467,466 B1 * | 10/2002 | Maekawa | ............ | F02D 41/0027 123/198 D |
| 7,627,416 B2 * | 12/2009 | Batenburg | ............ | F02D 19/027 123/525 |
| 7,836,865 B2 * | 11/2010 | Joos | ..................... | F02D 19/0605 123/431 |
| 7,913,673 B2 * | 3/2011 | Vanderslice | ........ | F02D 19/0631 123/27 GE |
| 8,905,059 B2 * | 12/2014 | Sommars | ............... | F02M 43/04 123/526 |
| 8,944,033 B2 * | 2/2015 | Coldren | ................ | F02D 19/061 123/525 |
| 8,997,720 B2 * | 4/2015 | Brown | ................ | F02M 63/029 123/525 |
| 2012/0055457 A1 * | 3/2012 | Wong | .................. | F02D 41/0027 123/674 |
| 2012/0285417 A1 * | 11/2012 | Kim | .................... | F02D 19/0684 123/299 |
| 2012/0325180 A1 * | 12/2012 | Montgomery | ........ | F02D 41/403 123/299 |
| 2013/0037622 A1 * | 2/2013 | Kim | ...................... | F02M 43/04 239/5 |
| 2013/0311067 A1 * | 11/2013 | Stockner | ............... | F02D 19/027 701/104 |
| 2014/0116523 A1 * | 5/2014 | Puckett | ............... | F02D 19/0673 137/12 |
| 2014/0188372 A1 * | 7/2014 | Puckett | ............. | F02M 21/0281 701/104 |

* cited by examiner

*Primary Examiner* — Hieu T Vo
*Assistant Examiner* — Arnold Castro
(74) *Attorney, Agent, or Firm* — Liell & McNeil Attorneys, PC

(57) ABSTRACT

A dual fuel common rail system may be operated in a regular mode in which a relatively large charge of gaseous fuel is ignited by compression igniting a relatively small injection quantity of liquid diesel fuel. The dual fuel system may be operated in a single fuel limp home mode in which liquid diesel fuel is injected at higher pressures. Over pressurization of the gaseous fuel side of the fuel system due to leaked liquid fuel is avoided by regularly injecting leaked liquid fuel, but not gaseous fuel, from the gaseous nozzle outlet set during the limp home mode of operation.

19 Claims, 6 Drawing Sheets

DUAL FUEL COMMON RAIL SYSTEM AND DIESEL ONLY METHOD OF OPERATING SAME

TECHNICAL FIELD

The present disclosure relates generally to dual fuel common rail systems, and more particularly to a diesel only method of operation that includes strategies to address liquid fuel leakage into the gaseous fuel side of the system.

BACKGROUND

One relatively new class of engines seeks to utilize two different fuels to gain the efficiencies associated with compression ignition combined with the advantages associated with burning natural gas fuel. In particular, one type of dual fuel engine utilizes a small pilot injection quantity of liquid diesel fuel that is compression ignited to in turn ignite a much larger charge of natural gas fuel in each engine cylinder. In one strategy for this type of engine, both fuels are directly injected from a single fuel injector associated with each engine cylinder. For instance, U.S. Pat. No. 7,627,416 appears to teach a dual fuel common rail system in which liquid diesel fuel and natural gas fuel are both injected from a single fuel injector associated with each engine cylinder. This reference recognizes that there may be instances in which the engine will need to operate solely on liquid diesel fuel due to exhaustion of the natural gas fuel supply or possibly some fault in the natural gas portion of the system. However, this reference neither recognizes some of the problems, nor teaches solutions, to some of challenges associated with operating the engine in a diesel only fueling mode.

The present disclosure is directed toward one or more of the problems set forth above.

SUMMARY

A method of operating a dual fuel engine includes operating a dual fuel common rail system in a regular mode and a limp home mode. More liquid fuel is leaked into a gaseous fuel portion of the dual fuel system when operating in the limp home mode versus the regular mode. Injecting liquid fuel from a first nozzle outlet set and injecting gaseous fuel from a second nozzle outlet set into an engine cylinder when operating the dual fuel common rail system in the regular mode. Liquid fuel is injected from the first nozzle outlet set and liquid fuel, but not gaseous fuel, is injected from the second nozzle outlet set into the engine cylinder when operating the dual fuel common rail system in the limp home mode.

In another aspect, a dual fuel common rail system includes a gaseous fuel common rail and a liquid fuel common rail. A plurality of fuel injectors are each fluidly connected to each of the gaseous fuel common rail and the liquid fuel common rail. A liquid fuel supply and pressure control system is fluidly connected to the liquid fuel common rail. A gaseous fuel supply and pressure control system is fluidly connected to the gaseous fuel common rail. An electronic controller is in control communication with the plurality of fuel injectors, the liquid fuel supply and pressure control system, and the gaseous fuel supply and pressure control system. The electronic controller includes a limp home algorithm configured to communicate liquid injection control signals to inject liquid fuel from a first nozzle outlet set and gaseous injection control signals to inject liquid fuel from a second nozzle outlet set. The electronic controller also includes a regular algorithm configured to communicate liquid injection control signals to inject liquid fuel from the first nozzle outlet set and gaseous injection control signals to inject gaseous fuel from the second nozzle outlet set.

DETAILED DESCRIPTION

Figure 1:
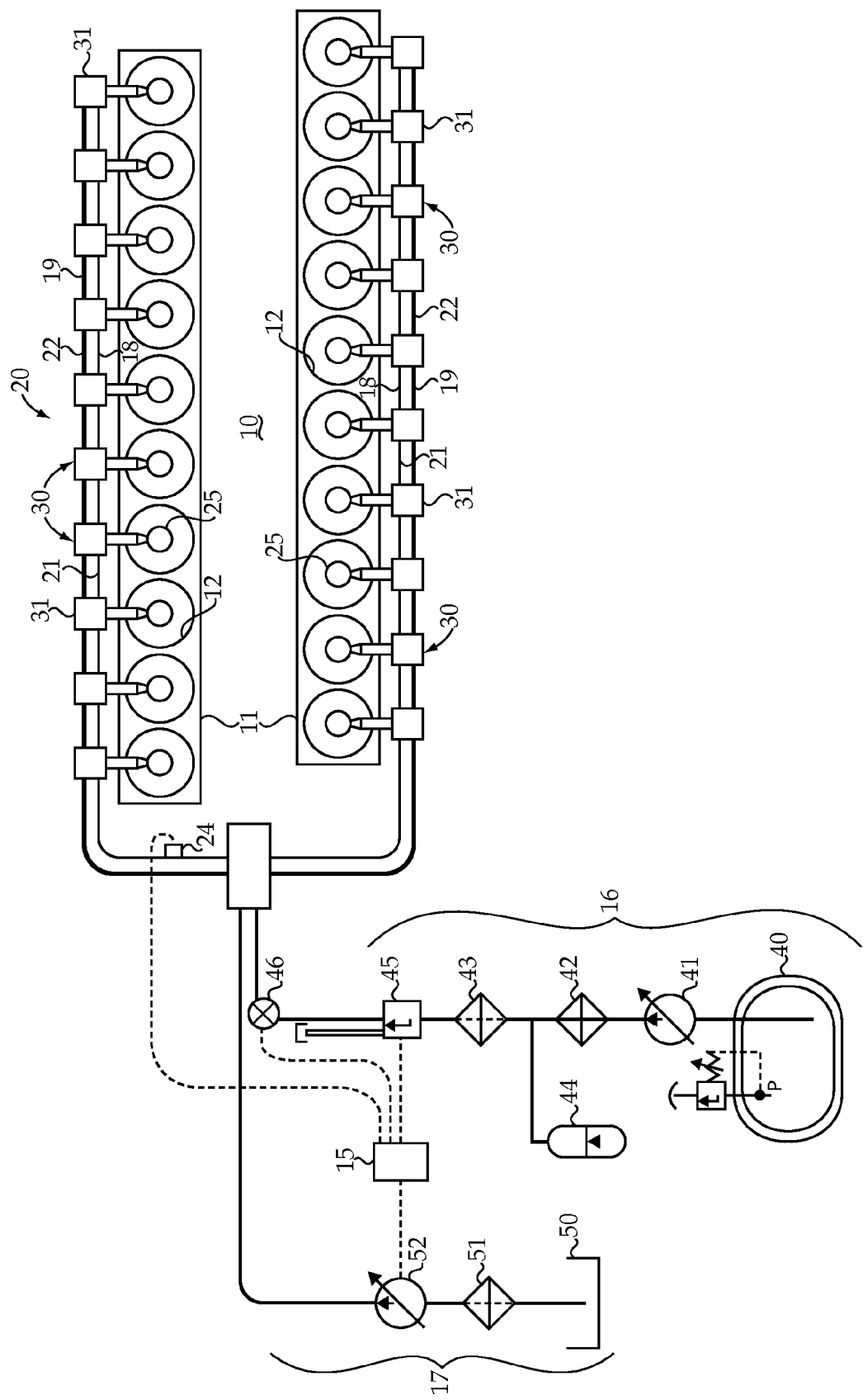
FIG. 1 is a schematic view of a dual fuel engine according to the present disclosure.
Figure 2:
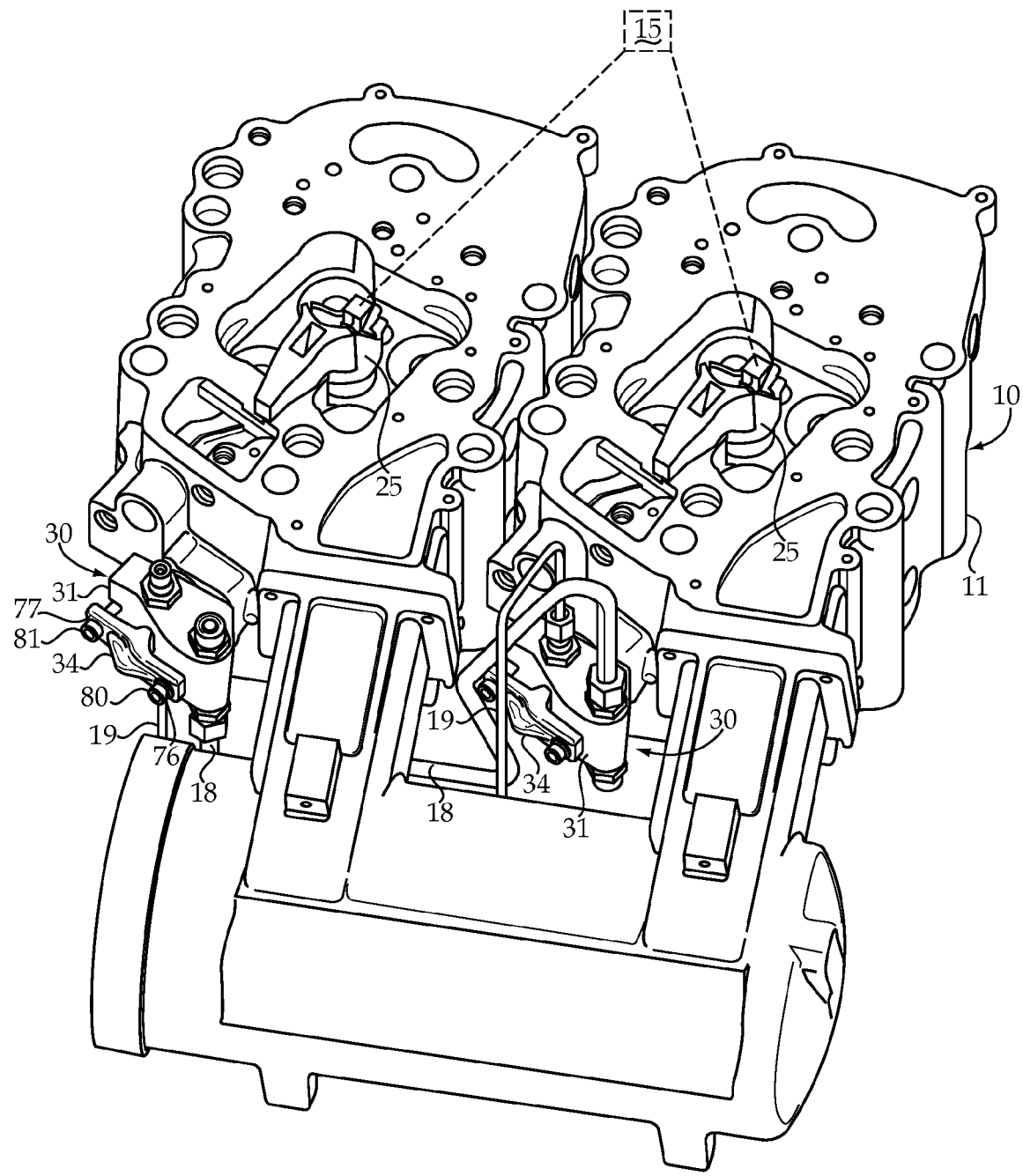
FIG. 2 is a perspective view of a portion of the engine and dual fuel common rail system for the engine of FIG. 1.
Figure 3:
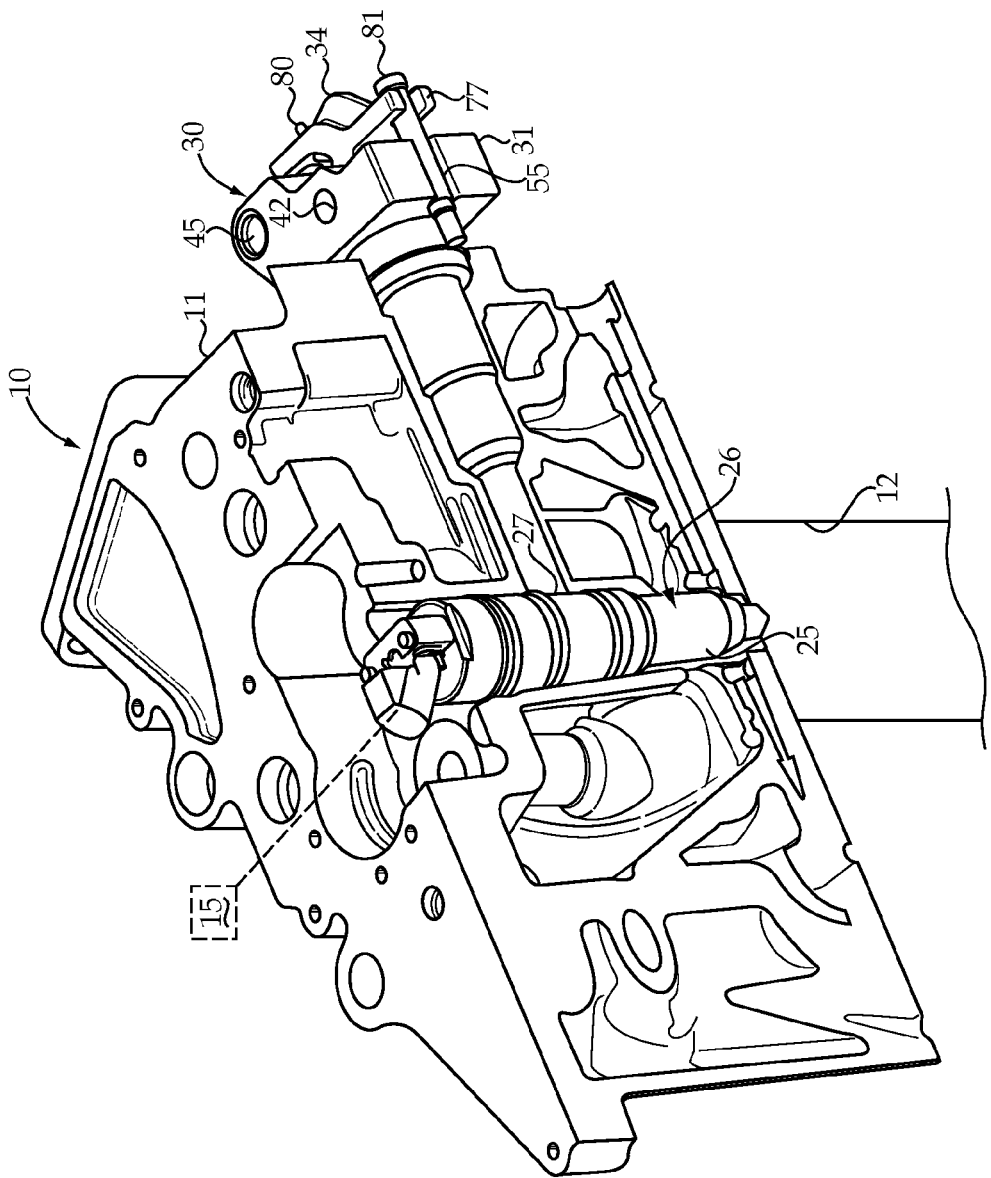
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are in control communication with, and controlled by, an electronic engine controller 15 in a known manner. The gas supply and pressure control devices 16 may include a pressurized cryogenic liquefied natural gas tank 40 with an outlet fluidly connected to a variable delivery cryogenic pump 41. Devices 16 may also include a heat exchanger 42, an accumulator 44, a gas filter 43 and a fuel conditioning module 45 that controls the supply and pressure of gaseous fuel to gaseous fuel common rail 21. The liquid supply and pressure control devices 17 may include a diesel fuel tank 50, fuel filters 51 and an electronically controlled high pressure fuel pump 52 that supply liquid fuel to, and control pressure in, liquid fuel common rail 22.

Figure 4:
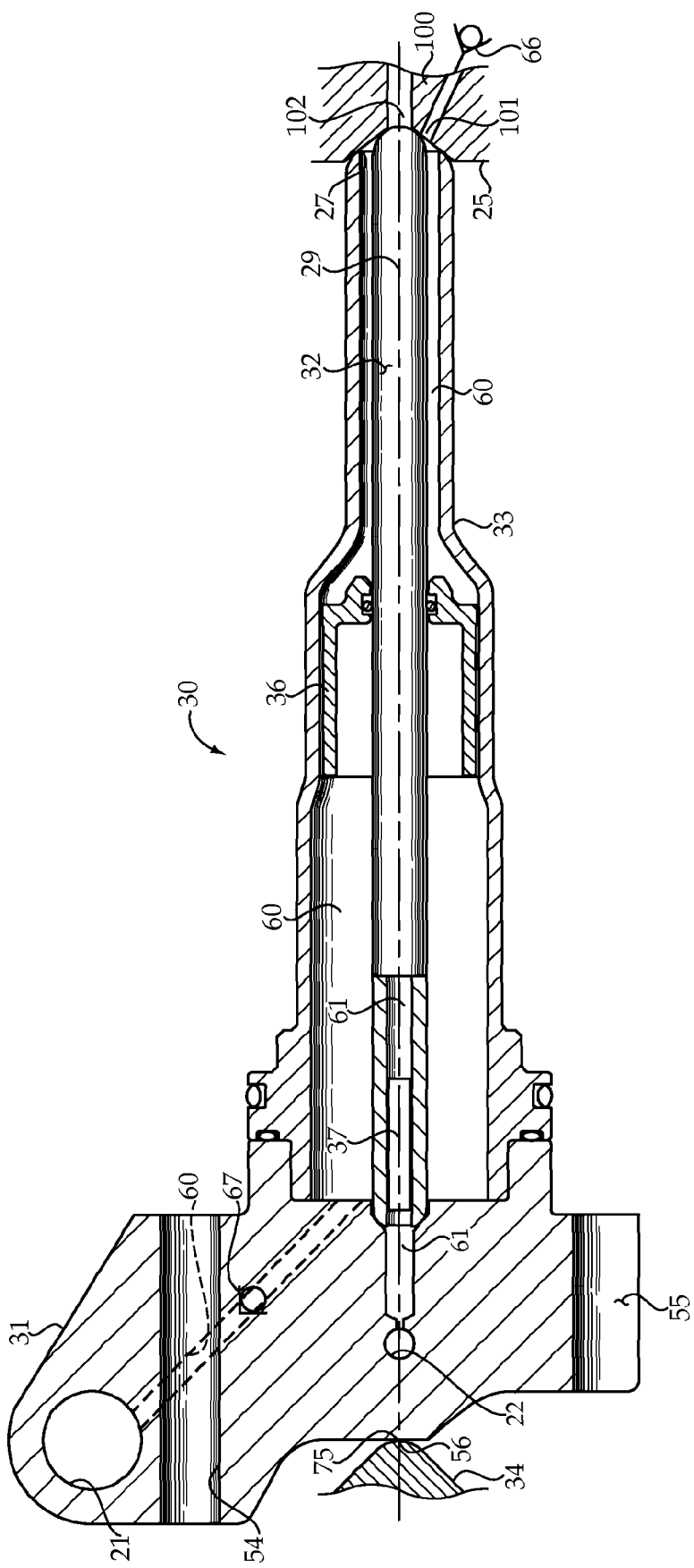
FIG. 4 is a sectioned side view through a co-axial quill assembly according to another aspect of the present disclosure.

Referring in addition to FIG. 4, the dual fuel common rail system 20 may include a co-axial quill assembly 30 with an inner quill 32 and an outer quill 33 in sealing contact with a common conical seat 27 of each fuel injector 25. The blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2. A coaxial quill assembly 30 is fluidly positioned between each of the plurality of fuel injectors 25 and each of the gaseous fuel common rail 21 and liquid fuel common rail 22.

Each co-axial quill assembly 30 may include a load adjusting clamp 34 with a pivot surface 75 in contact with a block 31 at a load adjustment location 56 that is intersected by the axis 29 of the inner quill 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. The fasteners 80 and 81 are received in fastener bore 54 and fastener slot 55, respectively of blocks 31.

Each block 31 of each co-axial quill assembly 30 defines a segment of gaseous fuel common rail 21 that is oriented perpendicular to the axis 29 of inner quill 32. A gaseous fuel passage 60 opens at one end into gaseous fuel common rail 21 and opens at its other end into first fuel inlet 101 of fuel injector 25. A segment of gaseous fuel passage 60 is located between the inner quill 32 and the outer quill 33. Each of the blocks 31 also defines a segment of liquid fuel common rail 22. A liquid fuel passage 61 opens at one end into liquid fuel common rail 22, and opens at its opposite end into second fuel inlet 102 of fuel injector 25.

In order to trap metallic debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the inner quill 32. The gaseous fuel edge filter 36 is shown positioned within outer quill 33. Those skilled in the art will appreciate that the edge filters 36 and 37 could be located elsewhere, or omitted, without departing from the scope of this disclosure.

Figure 5:
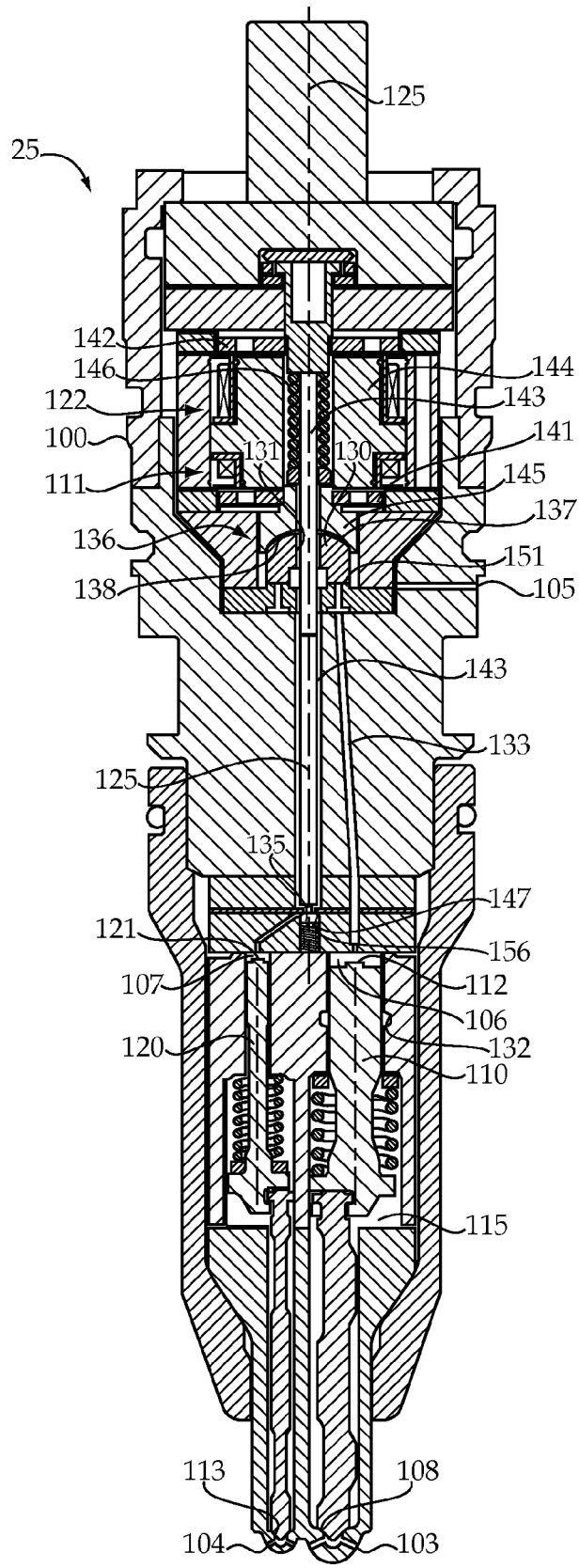
FIG. 5 is a sectioned front view of a fuel injector according to an aspect of the present disclosure.

Referring in addition to FIG. 5, a fuel injector 25 according to the present disclosure includes an injector body 100 that defines a first nozzle outlet set 103, a second nozzle outlet set 104 and a drain outlet 105. Injector body 100 also defines a first fuel inlet 101 and a second fuel inlet 102 that can be seen in the sectioned view of FIG. 4 opening through the common conical seat 27 of fuel injector 25. Disposed within injector body 100 are a first control chamber 106 and a second control chamber 107. A first check valve member 110 has a closing hydraulic surface 112 exposed to fluid pressure in the first control chamber 106. The first check valve member 110 is movable between a closed position, as shown, in contact with a first seat 108 to fluidly block the first fuel inlet 101 to the first nozzle outlet set 103, and an open position out of contact with the first seat 108 to fluidly connect the first fuel inlet 101 to the first nozzle outlet set 103 via a passage not visible in the sectioned view of FIG. 5. A second check valve member 120 has a closing hydraulic surface 121 exposed to fluid pressure in the second control chamber 107. The second check valve member 120 is movable between a closed position, as shown, in contact with a second seat 113 to fluidly block the second fuel inlet 102 to the second nozzle outlet set 104, and an open position out of contact with the second seat 113 to fluidly connect the second fuel inlet 102 to the second nozzle outlet set 104 via a passage not visible in the sectioned view of FIG. 5. Thus, injection of a first fuel (e.g., natural gas) through first nozzle outlet set 103 is facilitated by movement of first check valve member 110, while injection of a second fuel (e.g., liquid diesel) through second nozzle outlet set 104 is facilitated by movement of the second check valve member 120. Those skilled in the art will appreciate that the first and second nozzle outlet sets 103, 104 might be expected to each include six nozzle outlet sets that are arranged around respective centerlines in a manner well known in the art. However, nozzle outlet sets 103 and 104 could each include as few as one nozzle outlet or any number of nozzle outlets in any arrangement without departing from the present disclosure.

A first control valve member 130 is positioned in injector body 100 and is movable along a common centerline 125 between a first position in contact with flat seat 151 at which the first control chamber 106 is fluidly blocked to the drain outlet 105, and a second position at which the first control chamber 106 is fluidly connected to the drain outlet 105 via control passage 133. When first control chamber 106 is fluidly connected to drain outlet 105, pressure in first control chamber 106 drops, relieving pressure on closing hydraulic surface 112 to allow first check valve member 110 to lift to facilitate an injection of the first fuel (e.g. natural gas) through first nozzle outlet set 103. A second control valve member 135 is positioned in the injector body 100 and movable along the common centerline 125 between a first position in contact with flat seat 156 at which the second control chamber 107 is fluidly blocked to the drain outlet 105, and a second position out of contact with flat seat 156 at which the second control chamber 107 is fluidly connected to the drain outlet 105. When second control chamber 107 is fluidly connected to drain outlet 105, fluid pressure acting on closing hydraulic surface 121 is relieved to allow second check valve member 120 to lift to an open position to facilitate injection of the second fuel (e.g. liquid diesel) through the second nozzle outlet set 104.

In the illustrated embodiment, the second control valve member 135 is intersected by the common centerline 125, but the first control valve member 130 defines a bore 131 therethrough that is concentric with common centerline 125. In the illustrated fuel injector 25, the respective control valve members 130, 135 may be moved to one of their respective first and second positions with first and second electrical actuators 111, 122, respectively. The control valve members 130, 135 may be biased to the other of their respective first and second positions by a spring(s) 146, 147. In particular, a first armature 141 may be attached to a pusher 145 in contact with first control valve member 130. The first armature 141, the pusher 145 and the first control valve member 130 may be biased to the position shown in contact with flat seat 151 by biasing spring 146. The control valve member 130 may rotate slightly about an axis perpendicular to common centerline 125 through the action of a self alignment feature 136 that allows convex surface 137 to move on a concave bearing surface 138 each time control valve member 130 contacts flat seat 151. Thus, first armature 141 can be thought of as being operably coupled to move the first control valve member 130, and a second armature 142 may be operably coupled to move the second control valve member 135 by way of a plurality of pushers 143. A common stator 144 separates the first armature 141 from the second armature 142.

The first control valve member 130 is in contact and out of contact with flat seat 151 at the first position and the second position, respectively. Likewise, the second control valve member 135 is in contact and out of contact with flat seat 156 at its first position and second position, respectively. Either, one or both of seats 151 and 156 may be a conical seat. First control valve member 130 may be coupled to move with first armature 141 responsive to de-energizing the lower coil mounted in common stator 144. When the lower coil mounted in common stator 144 is energized, armature 141 and pusher 145 are lifted upward allowing the high pressure in control passage 133 to push first control valve member 130 out of contact with flat seat 151 to fluidly connect control chamber 106 to drain outlet 105. First control chamber 106 and second control chamber 107 may always be fluidly connected to second fuel inlet 102 via passages not visible in the section view of FIG. 5. Thus, liquid diesel originating in second fuel inlet 102 may be utilized as the control fluid to control the operation of first check valve member 110 to facilitate gaseous fuel injection events and second member 120 to facilitate liquid fuel injection events.

A hydraulic lock seal 132 in the form of an annulus always fluidly connected to second fuel inlet 102 may be useful in inhibiting the migration of gaseous fuel from gaseous nozzle chamber 115 up into control chamber 106. Gaseous nozzle chamber 115 is always fluidly connected to first fuel inlet 101 via passages not visible in FIG. 5. Referring specifically to FIGS. 4 and 5, the present disclosure teaches a strategy to inhibit liquid fuel from migrating from the respective fuel injectors 25 toward gaseous fuel common rail 21 under certain conditions. When dual fuel common rail system 20 is operating in a regular mode, the liquid fuel common rail may be maintained at a medium high pressure (e.g., maybe 40 MPa), and the gaseous fuel common rail 22 may be maintained at medium low pressure (e.g., maybe 35 MPa). This slight pressure differential is intended to inhibit leakage of gaseous fuel into the liquid fuel portions of fuel injector 25 and hence the entire dual fuel common rail fuel system 20. The inclusion of hydraulic lock seal 132 is another feature to inhibit gaseous fuel from migrating into the liquid fuel side of dual fuel common rail system 20. Nevertheless, one might expect some amount of leakage of liquid fuel into the gaseous fuel side of the system during regular mode of operation, but this small amount of leakage may be encouraged in order to facilitate proper lubrication of moving parts. For instance, a small amount of liquid diesel fuel may leak from hydraulic lock seal 132 down into gaseous nozzle chamber 115 during a regular mode of operation. One could expect this small amount of liquid diesel to be ejected from nozzle outlet set 103 which with each gaseous injection event. This small amount of leaked liquid diesel may serve to help lubricate the guiding movement of first check valve member 110 and the seat 108 during regular mode of operation.

Dual fuel common rail fuel system may also have a single fuel mode of operation in which only liquid diesel fuel is utilized to power engine 10. This mode of operation may be referred to as a limp home mode, as this mode of operation may only be preferable when there is some fault in the gaseous fuel system. In accordance with the present disclosure, a fault may include a malfunction of one or more of gas supply pressure control devices 16, a malfunction elsewhere in dual fuel common rail fuel system 20, or may simply relate to a lack of sufficient gaseous fuel to continue operating in the regular mode. When operating in a limp home mode, electronic controller 15 may maintain the liquid fuel common rail 22 at a high pressure (e.g., maybe 80 MPa), whereas the pressure in gaseous fuel common rail 21 may be allowed to decay, and may slowly drop as low as atmospheric pressure. During the limp home mode, engine 10 is operated as a conventional diesel engine in which liquid diesel fuel is injected through nozzle outlet set 104 in sufficient quantities and at timings to compression ignite. On the other hand, during the regular mode of operation, one might expect a relatively small pilot diesel liquid injection through nozzle outlet set 104 to be compression ignited to in turn ignite a much larger charge of gaseous fuel injected through nozzle outlet set 103 to power engine 10 in a regular mode of operation. Due to the higher pressure differential between the liquid fuel and the gaseous fuel that exists during the limp home mode of operation, one might expect more liquid fuel to leak into the gaseous side of dual fuel common rail system 20 than would leak during a regular mode of operation with a smaller pressure differential between the two fuels. Because little to no gaseous fuel is utilized during the limp home mode of operation, and because the leakage rate of liquid fuel into the gaseous fuel side is greater, the present disclosure teaches the inclusion of a check valve 66 or 67 to prevent built up leaked liquid diesel in gaseous nozzle chamber 115 from eventually reaching and entering the gaseous common rail 21. Referring specifically to FIG. 4, in one specific embodiment, a check valve 66 may be located in the passageway extending from first fuel inlet 101 to the gaseous nozzle chamber 115 within the individual fuel injector body 100. On the other hand, FIG. 4 also shows an alternative location in which the check valve 67 may be located in the gaseous fuel passage 60, such as within block 31. Those skilled in the art will appreciate that the check valve 66 or 67 blocks leaked liquid fuel from migrating to gaseous fuel common rail 21 during a limp home mode of operation, but is open and allows the free flow of gaseous fuel toward gaseous nozzle chamber 115 during the regular mode of operation.

Referring back to FIG. 1, although not necessary, dual fuel common rail system 20 may also include an electronically controlled isolation valve 46 operably positioned between the gaseous fuel supply and pressure control devices 16 and the gaseous fuel common rail 21. Isolation valve 46 may be mechanically biased toward a closed position but movable to an open position responsive to a control signal from electronic controller 15. When dual fuel common rail fuel system 20 is being operated in a regular mode, electronic controller 15 may maintain isolation valve 46 in an open position. However, in the event that the system transitions into a limp home mode of operation, the electronic controller 15 may close isolation valve 46 to fluidly isolate the gas supply and pressure control devices 16 from any leaked liquid diesel fuel that may find its way into the gaseous side of dual fuel common rail system 20.

The present disclosure recognizes that, during limp home mode of operation, leaked liquid diesel fuel may tend to raise pressure in the gaseous fuel side of the dual fuel common rail system 20. For instance, the gaseous fuel side of dual fuel common rail system 20 may be designed to tolerate a regular operating pressure (e.g., maybe 35 MPa), but be unable to reliably contain the higher liquid fuel pressures (e.g., maybe 80 MPa) associated with the liquid fuel common rail 22 during limp home mode of operation. In order to prevent the gaseous fuel side of dual fuel common rail system 20 from becoming over pressurized during a limp home mode of operation, the present disclosure teaches periodic small injections of accumulated leaked liquid fuel in the gaseous nozzle chamber 115 out through nozzle outlet set 103 into the engine cylinder 12. Because of the inclusion of check valve(s) 66, 67, the pressure downstream of the check valve(s) 66 or 67 may be substantially higher than the residual pressure in gaseous fuel common rail 21 when operating in the limp home mode. Furthermore, the pressure downstream from the respective check valve(s) 66, 67 associated with different fuel injectors may be different due to different leakage rates. Thus, the present disclosure teaches a possible need for some experimentation to determine what leakage rates could be expected and the expected variance about that average leakage rate in order to determine potential worst case scenarios as far as the build up of pressure downstream from the check valve(s) 66, 67. This information could then be utilized to develop an open loop strategy for relieving pressure downstream of the check valve(s) 66, 67 by opening the first check valve member 110 to inject liquid fuel from the gaseous nozzle outlet set 103 when engine cylinder conditions are appropriate. For instance, the present disclosure might also seek to avoid an injection strategy that avoids possible ingestion of cylinder gases into the gaseous nozzle chambers 115 of the individual fuel injectors. Thus, the frequency and timing of open loop injection events to relieve liquid fuel pressure in the gaseous nozzle chamber 115 during limp home mode of operation may be chosen to avoid gas ingestion and avoid over pressurization even under worst case scenario leakage rates in one or more of the fuel injectors 25. For instance, one strategy might simply call for injecting liquid diesel fuel leaked into gaseous nozzle chamber 115 in a brief injection event toward the beginning of each intake stroke in each engine cycle in order to ensure that the injected amount is too small to cause early ignition in the respective engine cylinder but the frequency of injections could be sufficient to prevent build up of pressure and potential over pressurization even under worst case leakage scenarios. Furthermore, such a strategy might also ensure that cylinder gases are not ingested into one or more of the fuel injectors 25 because cylinder pressures are low and the leakage rate associated with one or more of the fuel injectors 25 may also be relatively low resulting in a substantial variance among different fuel injectors 25 of the pressure downstream from the respective check valve(s) 66, 67.

An alternative strategy might be to omit the check valve(s) 66, 67 and rely upon pressure information communicated from the pressure sensor 24 to the electronic controller 15 to controllably monitor pressure and inject accumulated liquid diesel fuel by monitoring the potential increase in the gaseous fuel common rail 21 as communicated by pressure sensor 24 (FIG. 1). In other words, when isolation valve 46 is closed during a limp home mode of operation, one could expect leaked liquid diesel fuel into the respective gaseous nozzle chamber 115 to slowly increase pressure in the gaseous fuel common rail 21 as accumulated liquid migrated from the respective fuel injectors toward the gaseous fuel common rail 21. When the pressure in the gaseous fuel common rail 21 reached some threshold (e.g., may be 35 MPa) the different fuel injectors 25 could be actuated at appropriate timings and durations to utilize the accumulated pressure to push or inject accumulated leaked liquid diesel from the respective gaseous nozzle chambers 115 into the engine cylinders 12. Because the injection pressure would be known, and because the engine cylinders are predictable, timings and durations of injection events to inject the leaked liquid diesel from the gaseous nozzle outlet sets could be chosen to both avoid cylinder gas ingestion into the respective fuel injectors and inject quantities that would not significantly contribute to the heat release in the individual cylinder to undermine control logic associated with the bulk of fueling occurring during the limp home mode.

The present disclosure again recognizes that the leakage rates of liquid diesel associated with the different fuel injectors 25 may be substantially different, with the result being a relatively high uncertainty as to which fuel injector 25 is contributing most to the leakage and build up of pressure. Thus, one embodiment of the present disclosure might include both a check valve(s) 66, 67 and the isolation valve 46. In addition, the present disclosure recognizes that the pressure sensor 24 may itself be at fault rendering a controlled strategy for injecting leaked liquid diesel relatively untenable. Thus, one embodiment of the present disclosure will include an open loop strategy for injecting liquid diesel fuel accumulated downstream of each respective check valve(s) 66, 67 and may or may not also include a controlled strategy that causes liquid injection events through the gaseous nozzle outlet sets 103 responsive to pressure in the gaseous fuel common rail 21 in a controlled manner.

Electronic controller 15 according to the present disclosure may include a limp home algorithm configured to communicate liquid injection control signals to inject liquid fuel from the liquid nozzle outlet sets 104 and gaseous injection control signals to inject liquid fuel from the gaseous nozzle outlet set 103. In addition, one could expect the electronic controller 15 to include a regular algorithm configured to communicate liquid injection control signals to inject liquid fuel from the liquid nozzle outlet set 104 and gaseous injection control signals to inject gaseous fuel from the gaseous nozzle outlet set 103. One might also expect the limp home algorithm to be configured to maintain a ratio of the liquid common rail pressure to the gaseous common rail pressure high. In addition, the regular algorithm may be configured to maintain the ratio of the liquid common rail pressure to the gaseous common rail pressure low. The limp home algorithm may or may not be configured to control at least one of timing and duration injection of liquid fuel from the gaseous nozzle outlet set 103 responsive to a gaseous common rail pressure communicated to electronic controller 15 from pressure sensor 24.

In the illustrated embodiment, the first check valve member 110 and the second check valve member 120 move along respective lines that are each parallel to, but spaced apart from common centerline 125. Nevertheless, those skilled in the art will appreciate that the structure could be different. For instance, dual concentric check valve members that were concentric with common centerline 125 would also fall within the scope of the present disclosure.

Industrial Applicability

The present disclosure applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures. The present disclosure also applies to a dual fuel common rail system with the ability to operate in a regular mode utilizing both fuels, and also a limp home mode in which the engine is fueled only by a single one of the fuels. For instance, a limp home mode might correspond to utilizing liquid diesel fuel due to a lack of gaseous fuel availability. The present disclosure applies specifically to preventing over pressurization of a gaseous fuel side of a dual fuel common rail system when operating in a limp home mode due to leakage of liquid fuel from the liquid fuel side to the gaseous fuel side.

Referring back to all of the FIGS. 1-5, a regular method of operating dual fuel engine 10 begins by assembling a dual fuel common rail system 20 to an engine housing 11. Gaseous fuel is supplied from the gaseous fuel common rail 21 to each of the plurality of fuel injectors 25 by a respective co-axial quill assembly 30. Likewise, liquid fuel from a liquid fuel common rail 22 is supplied to each of the plurality of fuel injectors 25 by the same respective co-axial quill assemblies 30. When in the regular mode of operation, gaseous fuel is injected from each fuel injector 25 into an engine cylinder 12 responsive to a gaseous fuel injection signal communicated from electronic engine controller 15 to the fuel injector 25. Liquid fuel from the fuel injector 25 is injected directly into engine cylinder 12 from the same fuel injector 25 responsive to a liquid fuel injection signal from electronic engine controller 15. A method of operating dual fuel engine 10 includes operating dual fuel system 20 in a regular mode preferably most of the time. Preferably a minority of the time, the dual fuel common rail system 20 will be operated in a limp home mode, which could be attributable to an exhausted gaseous fuel supply or maybe some fault in the gaseous fuel system causing a switch over into a single fueling mode. In any event, one could expect more liquid fuel to leak into the gaseous fuel portion of the dual fuel common rail system 20 when operating in the limp home mode versus the regular mode. When operating in the regular mode, the liquid fuel is injected from the liquid nozzle outlet set 104 and gaseous fuel is injected from the gaseous nozzle outlet set 103 into an engine cylinder 12. When operating dual fuel common rail system 20 in the limp home mode, liquid fuel is injected from the liquid nozzle outlet set 104 and liquid fuel, but not gaseous fuel, is injected from the gaseous nozzle outlet set 103 into the engine cylinder 12. When operating in the limp home mode, the electronic controller 15 will act to maintain a ratio of the liquid common rail pressure to the gaseous common rail pressure high, but maintain that ratio low when operating the dual fuel common rail system 10 in the regular mode. When operating in the limp home mode, the check valve(s) 66, 67 will be effective in blocking leaked liquid fuel from reaching the gaseous fuel common rail 21. If equipped with an isolation valve 46, the method of operating may include isolating the gaseous fuel supply and pressure control devices 16 from the gaseous fuel common rail 21 in the limp home mode, but not in the regular mode. Depending upon preferences, the timing and duration of leaked liquid fuel from the gaseous nozzle outlet set 103 may be controlled in at least one of timing and duration responsive to pressure in the gaseous fuel common rail 21, such as via pressure communicated from sensor 24 to electronic controller 15. On the other hand, if the leaked liquid fuel is being purged or injected in an open loop fashion, the timing and duration of injection of leaked liquid fuel from the gaseous nozzle outlet set 103 may be controlled in at least one of timing and duration without consideration of pressure in the gaseous fuel common rail 21.

Figure 6:
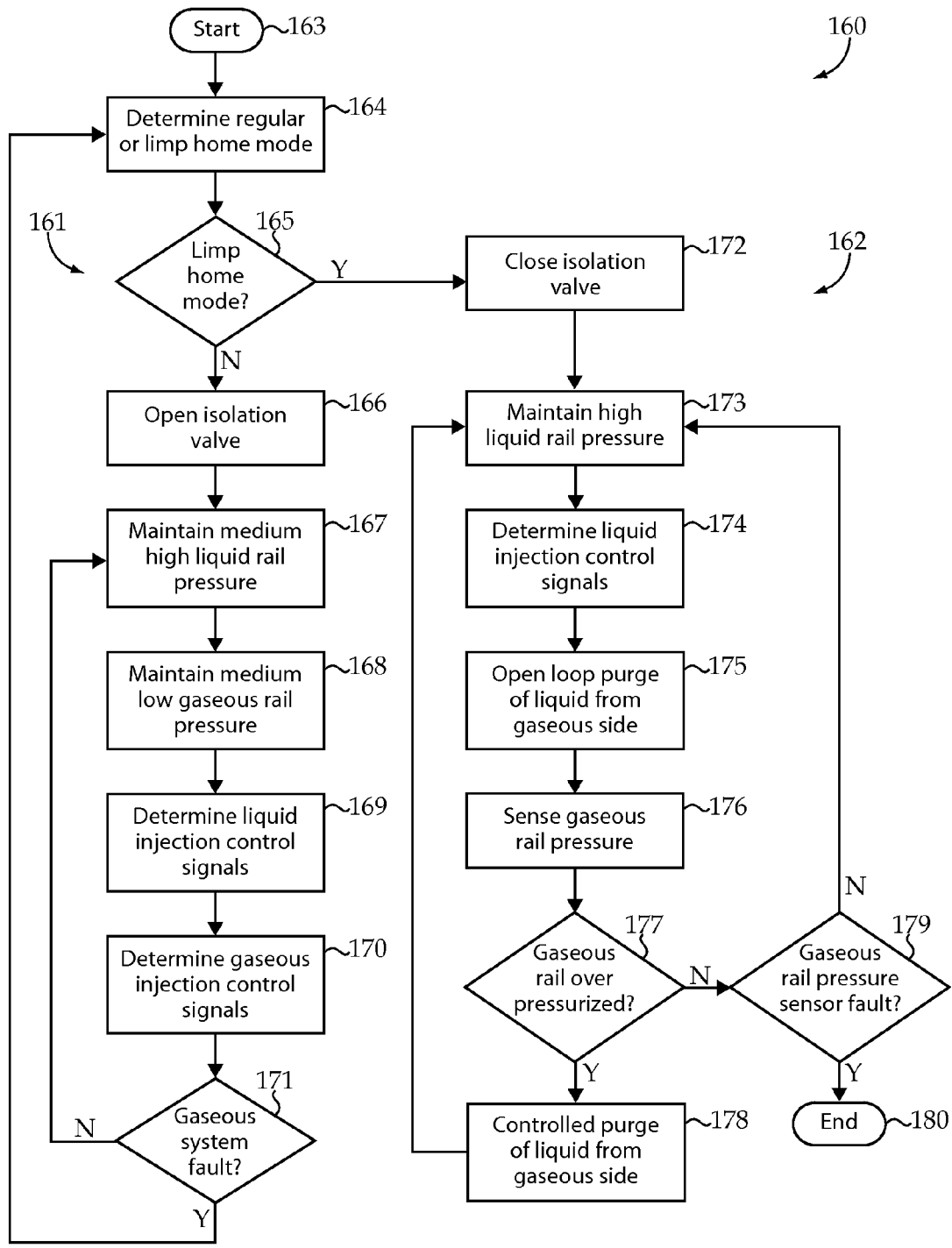
FIG. 6 is a logic flow diagram showing a method of operating the engine of FIG. 1.

Referring now specifically to FIG. 6, one example fueling control algorithm 160 according to the present disclosure is illustrated. The logic starts at oval 163 and proceeds to block 164 where electronic controller 15 would determine whether the dual fuel common rail system 20 should be operated in a regular mode or a limp home mode. If operating according to a regular algorithm 161, query 165 will advance the logic to block 166 where the isolation valve 46 will be opened. At block 167, electronic controller 15 will maintain the liquid rail pressure at a medium high level, such as 40 MPa. At block 168, electronic controller 15 will maintain the gaseous rail pressure at a medium low level, such as may 35 MPa. Depending upon such factors as engine speed and load and other considerations, the electronic controller 15 will at block 169 determine liquid injection control signals. At block 170, electronic controller will determine gaseous injection control signals. For instance, a typical regular mode of operation might include a small pilot injection of liquid diesel fuel at or around top dead center of an individual cylinder 12. This small amount of liquid diesel fuel will immediately compression ignite and then the electronic controller will command a gaseous fuel injection event to supply a much larger charge of gaseous fuel to the individual cylinder 12. The compression ignition of the pilot quantity of liquid diesel fuel will serve to ignite the much larger charge of gaseous fuel. At query 171, the logic may query as to whether the gaseous system fault has occurred. For instance, a gaseous system fault according to the present disclosure could simply mean that the gaseous fuel supply has been exhausted. Other gaseous fuel system faults include, but are not limited to, a malfunction in one or more of the gas supply and pressure control devices 16 or some other fault known in the art. If no gaseous system fault has occurred, the logic will return to block 167 and continue operation in the regular mode according to the regular algorithm 161. On the other hand, if a gaseous system fault is detected, the logic may loop back to block 164 to again determine whether to continue operation in the regular mode or transition to a limp home mode of operation.

If query 165 determines that the system is to be operated in the limp home mode, the logic will advance to block 172 to commence execution of the limp home algorithm 162. At block 172, the isolation valve 46 will be closed. Next, electronic controller 15 will maintain the liquid rail pressure high, such as on the order of maybe 80 MPa. At block 174, electronic controller 15 will determine liquid injection control signals to provide the necessary liquid diesel fueling to engine 10 according to the engine speed and load demands needed at a particular time. For instance, when operating in a limp home mode, one could expect substantially larger liquid fuel injections than those that might occur during the regular mode of operation. At block 175, an open loop purge strategy of liquid from the gaseous side of the common rail fuel system 20 may be accomplished by commanding gaseous fuel injection control signals to the individual fuel injectors 25 without consideration of the pressure in gaseous fuel common rail 21. For instance, small injections may occur on a regular basis when cylinder pressures are appropriate to inject small amounts of leaked liquid diesel fuel from the individual fuel injectors 25 on a regular basis to prevent any substantial build up of liquid diesel in the gaseous nozzle chambers 115 of the individual fuel injectors 25. At block 176, electronic controller may sense or determine the gaseous rail pressure from sensor 24. If the gaseous rail pressure has exceeded some threshold, such as maybe 35 MPa, the query 177 may determine that the gaseous side of fuel system 20 is becoming over pressurized, if so, at block 178 a controlled purge of leaked liquid fuel from the gaseous side of the fuel system may be accomplished by injecting leaked liquid fuel, but not gaseous fuel, from the gaseous nozzle outlet set 103 by communicating gaseous injection control signals to the individual fuel injectors 25. If the query 177 returns in negative meaning that the gaseous rail did not appear to be over pressurized, the logic may advance to query 179 in order to determine whether there has been a fault or failure of the gaseous rail pressure sensor 24. If yes, the logic may advance to oval 180 to end. On the other hand, if the query returns a negative result, the logic may loop back to block 173 and continue operating in the limp home mode according to the limp home algorithm 162.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of operating a dual fuel engine, comprising the steps of:
    operating a dual fuel common rail system in a regular mode;
    operating the dual fuel common rail system in a limp home mode;
    leaking more liquid fuel into a gaseous fuel portion of the dual fuel system when operating in the limp home mode versus the regular mode;
    injecting liquid fuel from a first nozzle outlet set and injecting gaseous fuel from a second nozzle outlet set into an engine cylinder when operating the dual fuel common rail system in the regular mode;
    injecting liquid fuel from the first nozzle outlet set and injecting liquid fuel, but not gaseous fuel, from the second nozzle outlet set into the engine cylinder when operating the dual fuel common rail system in the limp home mode.

2. The method of claim 1 including the steps of:
    maintaining a ratio of liquid fuel common rail pressure to gaseous fuel common rail pressure high when operating the dual fuel system in the limp home mode;

maintaining the ratio of liquid fuel common rail pressure to gaseous fuel common rail pressure low when operating the dual fuel system in the regular mode.

3. The method of claim 2 including a step of blocking movement of liquid fuel into the gaseous fuel common rail.

4. The method of claim 3 including isolating gaseous fuel supply and pressure control devices from the gaseous fuel common rail in the limp home mode, but not in the regular mode.

5. The method of claim 4 including controlling at least one of timing and duration of injection of liquid fuel from the second nozzle outlet responsive to the gaseous fuel common rail pressure.

6. The method of claim 5 including controlling at least one of timing and duration of injection of liquid fuel from the second nozzle outlet without consideration of the gaseous fuel common rail pressure.

7. The method of claim 1 including a step of blocking movement of liquid fuel into the gaseous fuel common rail.

8. The method of claim 1 including isolating gaseous fuel supply and pressure control devices from the gaseous fuel common rail in the limp home mode, but not in the regular mode.

9. The method of claim 1 including controlling at least one of timing and duration of injection of liquid fuel from the second nozzle outlet responsive to the gaseous fuel common rail pressure.

10. The method of claim 1 including controlling at least one of timing and duration of injection of liquid fuel from the second nozzle outlet without consideration of the gaseous fuel common rail pressure.

11. A dual fuel common rail system comprising:
a gaseous fuel common rail;
a liquid fuel common rail;
a plurality of fuel injectors each fluidly connected to each of the gaseous fuel common rail and liquid fuel common rail;
liquid fuel supply and pressure control devices fluidly connected to the liquid fuel common rail;
gaseous fuel supply and pressure control devices fluidly connected to the gaseous fuel common rail;
an electronic controller in control communication with the plurality of fuel injectors, the liquid fuel supply and pressure control devices, and the gaseous fuel supply and pressure control devices, and including a limp home algorithm configured to communicate liquid injection control signals to inject liquid fuel from a first nozzle outlet set and gaseous injection control signals to inject liquid fuel from a second outlet set, and including a regular algorithm configured to communicate liquid injection control signals to inject liquid fuel from the first nozzle outlet set and gaseous injection control signals to inject gaseous fuel from the second outlet set.

12. The dual fuel common rail system of claim 11 wherein the limp home algorithm is configured to maintain a ratio of liquid fuel common rail pressure to gaseous fuel common rail pressure high;
wherein the regular algorithm is configured to maintain the ratio of liquid fuel common rail pressure to gaseous fuel common rail pressure low.

13. The dual fuel common rail system of claim 12 including a check valve operably positioned to block movement of liquid fuel from each of the plurality of fuel injectors to the gaseous fuel common rail.

14. The dual fuel common rail system of claim 13 including an electronically controlled isolation valve operably positioned between the gaseous fuel supply and pressure control devices and the gaseous fuel common rail.

15. The dual fuel common rail system of claim 14 including a gaseous rail pressure sensor in communication with the electronic controller; and
wherein the limp home algorithm is configured to control at least one of timing and duration of injection of liquid fuel from the second nozzle outlet responsive to a gaseous fuel common rail pressure.

16. The dual fuel common rail system of claim 11 includes a check valve operably positioned to block movement of liquid fuel from each of the plurality of fuel injectors to the gaseous fuel common rail.

17. The dual fuel common rail system of claim 11 including an electronically controlled isolation valve operably positioned between the gaseous fuel supply and pressure control devices and the gaseous fuel common rail.

18. The dual fuel common rail system of claim 11 including a gaseous rail pressure sensor in communication with the electronic controller; and
wherein the limp home algorithm is configured to control at least one of timing and duration of injection of liquid fuel from the second nozzle outlet responsive to a gaseous fuel common rail pressure.

19. The dual fuel common rail system of claim 11 including a coaxial quill assembly fluidly positioned between each of the plurality of fuel injectors and each of the gaseous fuel common rail and the liquid fuel common rail.

* * * * *